UNITED STATES PATENT OFFICE 2,598,741

SMELTING OF ZINCIFEROUS ORE

Erwin C. Handwerk, Lehighton, and George T. Mahler, Palmerton, Pa., assignors to The New Jersey Zinc Company, New York, N. Y., a corporation of New Jersey No Drawing. Application June 28, 1950, Serial No. 170,936

4 Claims. (Cl. 75—14)

This invention relates to the smelting of zinciferous ore and, more particularly, to the electric furnace smelting of such ore.

Electric furnace smelting of zinc offers many attractions including simplicity of charge preparation and furnace operation as compared to those zinc smelting practices now in use. There have been innumerable proposals presented heretofore for the electric furnace smelting of zinciferous ores wherein a dry charge of the ore and reducing material is melted down with the concomitant liberation of metallic zinc vapor, but to the best of our knowledge no such operation has ever been put into commercial practice. It has been the experience of those who have tried these prior art proposals even on a small scale that the zinc vapor-bearing gases so produced could not be condensed without obtaining an excessive amount of blue powder or zinc dust, or both, and that the smelting operation itself was characterized by low zinc elimination from the charge and non-continuous operation.

We have now discovered that it is possible to smelt oxidic or oxidized zinciferous ores in a commercial scale in an electric arc furnace with the resulting production of metallic zinc vapor capable of being condensed predominantly to massive zinc metal. We have found that this result can be attained only by control of a combination of smelting conditions. These critical smelting conditions reside in an important relationship in the charge composition and in the manner in which the smelting is effected. Control of these critical conditions makes possible the smelting of a zinciferous ore with a carbonaceous reducing material in an electric arc furnace with the resulting production of a substantially zinc-free molten slag and a metallic zinc vapor capable of being condensed predominantly to massive zinc metal. Our smelting method comprises establishing in the charge composition an iron oxide content sufficient to provide after partial reduction thereof at least 1½% by weight of iron oxide (calculated as Fe) in the molten slag resulting from the smelting operation and a body of a molten iron product underlying a body of the slag, correlating the amount of reducing material to the iron oxide and other readily-reducible metal oxide components of the charge so as to effect substantially complete reduction of said other metal oxide components while effecting reduction of only such portion of the iron oxide component of the charge as to leave in the slag at least 1½% but not more than about 6% by weight of iron oxide (calculated as Fe), generating the smelting heat for this reduction within the furnace by an electric arc in contact with the body of molten slag, and effecting the reduction in a smelting zone above the body of molten slag and out of direct contact with the heating arc whereby smelting of the charge is effected at a temperature not in excess of 1450° C.

The smelting method of our invention is applicable to any oxidic zinciferous ore whether naturally occurring in the oxidized state or obtained by roasting blende. We have successfully smelted such representative ores which further varied from one extreme to the other in their zinc content. For example, we have smelted, and condensed metallic zinc vapor therefrom with efficiencies exceeding 85%, such ores or ore mixtures as calcined Sterling Hill ore having a 20% zinc content, a mixture of sintered Buchans River and New Calumet ores together with calcined Sterling Hill crude having a resulting zinc content of 30%, a sintered mixture of Buchans River, New Calumet and green ore residues containing 60% zinc, and a mixture of straight flash roasted Avalos, Paragsha and green ore residues analyzing 67.5% zinc.

In smelting the aforementioned ores, the slag tapped from the furnace contained only 0.1 to 0.8% zinc. The remainder of the zinc content of each charge was eliminated therefrom as metallic zinc vapor and was recovered. The lead and cadmium present in the ore were eliminated to the extent of at least 97–98% and were carried over in the zinc vapor. Only 0.02 to 0.15% iron has been detected in the condensed zinc metal when produced pursuant to the method of our invention, the amount of iron in the zinc then depending upon the iron content of the slag. Virtually all of the copper present in the ore is reduced and is concentrated in the iron product of the smelting operation. A major portion of the silver and substantially all of the gold in the ore charge appears in the iron product with the remainder of the silver appearing in the condensed zinc metal. When manganese is present in the ore, as it is in the case of Sterling Hill ore, most of the manganese remains in the slag and the remainder appears in the iron product. Accordingly, except for manganese, when this element is present in the zinciferous ore smelted in accordance with our invention, all of the valuable constituents of the ore are recovered either in the condensed zinc metal or in the molten pig iron product.

Oxidic zinciferous ores generally comprise zinc, cadmium, lead, copper, silver and iron, essentially in the form of oxides, which are readily reducible by carbonaceous material at temperatures within the range of about 1100° to 1400° C., as well as oxides of calcium, magnesium and silicon which are not readily reducible under these conditions. Smelting temperatures in the range of 1100° to 1400° C. can readily be obtained in an electric furnace. However, in order to heat the entire charge to a smelting temperature within this range in an electric furnace pursuant to conventional furnace technique, it is a characteristic of such operation that a substantial portion of the charge is heated to an appreciably higher temperature. We have found that when a portion of a charge derived from the reduction of oxidic zinciferous ore is heated to a temperature substantially above 1450° C., there is a pronounced tendency for one or more of the gangue constituents lime, magnesia and silica to be volatilized either directly or indirectly, or both. The lime, magnesia and silica may be volatilized directly in the form of the oxides per se, or they may be volatilzed indirectly in the form of the metals themselves by reduction of the lime, magnesia and silica to metallic form followed by reoxidation of the volatilized metals by carbon monoxide and carbon dioxide in the furnace atmosphere. Volatilization of these gangue constituents in the vicinity of the arc is followed by solidification of the vapors in a cooler portion of the furnace, and the solidified materials thereupon appear in the furnace atmosphere in the form of dust-like particles. These particles appear to promote the formation of physical and chemical blue powder when the zinc vapor-bearing smelting gases are cooled to effect condensation of the zinc. We have also found that when a portion of the unreduced charge is heated to a temperature substantially above 1450° C. there is an apparent volatilization of some of the readily-reducible metal oxides present in the charge. These volatilized metal oxides appear to be reduced in the furnace atmosphere by contact with carbon monoxide with the resulting production of the reduced metal and carbon dioxide, the latter being a strong oxidizing agent for zinc vapor. There is strong evidence to support the foregoing explanation inasmuch as the development of temperatures substantially above about 1450° C. in the unsmelted charge has been accompanied by the presence in the zinc condenser of an unusually high percentage of metals such as iron and copper, oxidized zinc vapor in the form of zinc dust, and significant quantities of the gangue constituents of the charge.

We have found that smelting temperatures not in excess of 1450° C. can be established in a zinciferous charge in an electric arc furnace when the charge is heated essentially by radiation from the arc and by contact with the body of hot slag which is produced in the course of the smelting operation and which is not permitted to exceed a temperature of 1450° C. when measured as temperature of the slag as tapped from the furnace. Thus, we have found that a zinciferous charge can be smelted effectively while the charge floats, in the form of a loose mass of discrete particles and out of direct contact with the heating arc, on the surface of the slag which is maintained fluid at temperatures of at least about 1100° C. The smelting appears to take place essentially in a zone immediately above the surface of the slag, some smelting occurring at the charge-slag interface and some smelting in the charge bank immediately thereabove. The smelting operation is endothermic and, as a result, the fresh charge has a high capacity for the absorption of heat from the arc and from the surface of the slag both by contact and by virtually black body radiation conditions. This endothermic absorption of heat from the slag and arc serves to control the temperature of the slag and unsmelted charge and makes possible the maintenance of smelting conditions wherein the temperature does not exceed the maximum 1450° C. temperature of the slag.

In the course of this smelting operation, the zinc, cadmium, lead, copper and silver oxides are readily reduced under these temperature conditions. However, we have discovered that, compared to the other readily-reducible components of the zinciferous ore, iron oxide is reduced with somewhat more difficulty at such temperatures not exceeding about 1450° C. Thus, we have found that all of the zinc oxide and other readily-reducible metal oxides of the charge can be reduced while some iron oxide remains unreduced. The presence of unreduced iron oxide in the slag is, accordingly, not inconsistent with substantially complete elimination from the slagged charge of the other readily-reducible oxides. As a matter of fact, we have found that the presence of such residual iron oxide in the slag can be used as a measure of the completeness of consumption of reduction carbon in the course of the smelting operation. The carbon, if allowed to enter the body of molten slag in any appreciable amount, promotes reduction and volatilization of the gangue constituents from the slag in the immediate vicinity of the arc. The absence of such a deleterious amount of free carbon in the slag is insured by the presence in the slag of a small but definite amount of unreduced iron oxide. Thus, we have discovered that if the zinciferous ore charged to the electric furnace is accompanied by sufficient iron oxide, with relation to the proportions of carbon and other readily-reducible metals in the ore, as to form by its partial reduction a metallic iron product and to leave unreduced at least one and one-half percent of iron oxide, expressed in terms of iron (Fe) by weight of the slag composition in which it dissolves, virtually all of the zinc component of the ore can be reduced without raising the temperature of the smelting charge above 1450° C. and without producing objectionable quantities of dust-forming constituents which hinder condensation of the zinc vapor predominantly to massive zinc metal. Incidentally, it has been our experience that when all of the zinc component of the ore has been reduced, virtually all of the cadmium, lead, copper and silver in the ore will also have been reduced.

In addition to a minimum amount of iron oxide which should be present in the slag produced in accordance with our invention, there is also a maximum amount of iron oxide which can be permitted to remain in the slag if satisfactory results are to be attained. As indicated hereinbefore, the slag produced in the smelting zone accumulates in a relatively large body thereof and this body of slag is heated directly by the arc. We have found that if this body of slag contains appreciably more than about 6% iron oxide (calculated as Fe), metallic iron appears in the furnace gases as a result of reduction and volatilization of iron oxide in the neighborhood of the electric arc, and this conversion of the iron oxide to metallic iron is accompanied by the production of carbon dioxide. This result has been clearly indicated by our observation that when the iron oxide content of the slag (calculated as Fe) substantially exceeds about 6% by weight an unduly large amount of metallic iron appears in the zinc metal condensate. The presence of a relatively large amount of iron in the zinc metal condensate is also undesirable because it introduces a complication into the subsequent refining of the zinc by rectification.

The upper limit of about 6% iron oxide in the slag is also significant for a wholly different reason. The production of a metallic iron product in accordance with our invention necessitates a further control of the amount of unreduced iron oxide remaining in the slag. Metallic iron formed by reduction of the iron oxide has a sufficient avidity for carbon to pick up, as it is produced in the smelting zone, an amount of carbon such as to render the iron molten at temperatures of about 1150°–1450° C. prevailing in the smelting zone. The metallic iron, being heavier than the slag, sinks to the bottom of the furnace and accumulates therein. Inasmuch as the smelting heat is supplied to the furnace through the medium of the arc in accordance with our invention, the temperature prevailing in the lower portion of the furnace below the slag layer will generally be somewhat lower than that of the slag itself. In order to make possible continuous operation of the furnace, the metallic iron must be maintained in a tappable molten state while the smelting operation proceeds at a temperature not in excess of 1450° C. The iron will have a melting point below 1450° C. if it contains at least 1½% to 2% carbon, and if the supernatant slag is not unduly oxidic the iron will automatically be carburized to this necessary extent by the carbonaceous material present in the charge. We have found that slags containing more than about 6% iron oxide (calculated as Fe) are so oxidic as to preclude carburization of the iron to the requisite extent. At the other extreme, the iron product will contain about 4% carbon, and will be molten at a temperature of about 1150° C., when the slag contains iron oxide to the extent of only 1½% by weight expressed as Fe. Accordingly, by appropriate correlation of the charge constituents as described hereinbefore in order to produce a slag which not only contains at least 1½% iron in the form of iron oxide but which also contains not more than about 6% iron in the form of iron oxide, the production of a molten iron product will be assured while maintaining a smelting temperature not in excess of 1450° C.

It will be seen, accordingly, that the correlation of the charge composition to effect substantially complete reduction of the zince component of the ore and to produce a molten slag product containing at least 1½% but not more than about 6% by weight of iron oxide (calculated as Fe) is important with respect to the production of metallic zinc vapor capable of being condensed predominantly to massive zinc metal. The maintenance of at least 1½% iron oxide in the slag insures the prevention of overheating of the charge and slag to such an extent as to volatilize the gangue-forming constituents of the ore or to volatilize some of the readily-reducible metal oxides in the charge which ultimately cause the production of carbon dioxide in the furnace atmosphere where it can oxidize the zinc vapor to form zinc dust. The maintenance of an upper limit of about 6% iron oxide in the slag product makes possible the production of a tappable iron product while carrying out the zinciferous ore smelting at a temperature not in excess of about 1450° C. and further insures a sufficiently low iron oxide content in the body of molten slag exposed to the heating arc to prevent the volatilization of such an amount of iron from the slag as will contaminate the condensed zinc metal to an objectionable extent.

The amount of iron oxide which should be present in the furnace charge cannot be stated with analytical certainty. As pointed out hereinbefore, the iron oxide content of the charge should at least be sufficient to provide after partial reduction thereof at least 1½% iron (Fe) in the slag in the form of iron oxide. In general, the iron oxide content of the charge should be of the order of at least 2 to 3% iron (Fe) by weight of the metalliferous portion thereof (i. e. excluding the weight of reducing material and extraneous flux, if any). Thus, oxidic zinciferous ores containing as little as 2 to 3% iron (Fe) can be smelted effectively in accordance with our invention without requiring the addition of extraneous amounts of iron oxide. Zinciferous ores running lower than about 2% iron should be supplemented by an additional amount of iron oxide from any appropriate source. There is no critical upper limit to the amount of iron oxide which may be contained in the charge smelted in accordance with our invention, the only limits being those dictated by economy inasmuch as the smelting of excess iron oxide wastefully consumes electric power and reducing material.

The reducing materials useful in practicing our invention are those solid carbonaceous materials conventionally used in metallurgical smelting operations. Thus, coal and coke may be used with particular advantage and preferably in the form of particles ranging from a maximum of about ½ inch in diameter down to those of dust coal. The amount of carbonaceous material used in practicing our invention should be such as to effect substantially complete reduction of the zinc oxide of the ore, along with the relatively small accompanying amounts of the readily-reducible lead, cadmium, copper and silver oxides, as well as reduction of such an amount of the iron oxide content of the charge as to leave unreduced in the slag at least 1½% iron in the form of iron oxide. Control of the amount of carbon in the charge may be effected by occasional analysis of the slag, the correct proportion of carbon in the charge being indicated by the presence of at least 1½% and not more than 6% iron in the form of iron oxide in the slag.

The maintenance of the aforementioned iron oxide component in the slag and the maintenance of a smelting temperature not in excess of 1450° C. (as measured by the temperature of the slag as tapped) are significant features of the method of our invention. It is the combination of these features which makes possible the smelting of the ore in such manner as to produce metallic zinc vapor capable of being condensed predominantly to massive zinc metal. The zinc component of the ore, as well as the other readily-reducible metals therein, tends to prevent fusion of the charge. As a result there is little if any tendency for the ore to fuse or melt at smelting temperatures below about 1450° C. until substantially all of the heat-absorbing zinc and other readily-reducible metal oxides have been removed from the charge by the smelting operation. It is therefore possible, provided a smelting temperature not in excess of 1450° C. is maintained, to effect smelting of the ore while it is maintained above the surface of the molten slag layer with attendant advantages as described hereinafter. The gangue constituents of the ore, after the reducible metals have been eliminated by smelting, form a relatively fusible mixture and, upon accumulation, become the slag body.

In the course of our experimental work we endeavored to heat the electric smelting furnace by the conventional practices of open-arc heating and slag resistance heating. Neither of these procedures would produce the desired zinc vapor product capable of condensation to massive metallic zinc without the simultaneous production of excessive amounts of zinc dust. Direct open-arc heating of the fresh charge, to the extent necessary to heat the charge to a smelting temperature, caused such excessive local overheating adjacent the arc as to produce overwhelming amounts of zinc dust. We then attempted to heat the furnace essentially by slag resistance heating, and for this purpose we carried out the smelting operation in such manner as to produce a relatively thick slag layer and maintained the electrodes sufficiently immersed in the slag as to produce a steady heating current indicative of the substantial absence of arcing. It was found that the smelting of the fresh charge adjacent the surface of the slag absorbed heat at such a rate, compared to the rate of heat input to the slag by means of slag resistance heating, as to chill the surface of the slag layer. As this chilling took place, the resistance of the relatively cool slag increased and caused the current to flow through only the lowermost relatively hot portion of the slag layer in a path that included the molten iron layer. As a result, the surface of the slag layer soon froze and it became virtually impossible to smelt any further charge addition.

We have found, however, that zinciferous ores can be satisfactorily smelted in an electric arc furnace if the charge, correlated as described hereinbefore, is smelted out of direct contact with the heating arc. The smelting heat is imparted to the charge, in accordance with our invention, through the medium of the body of molten slag maintained in the furnace and through radiation from the arc to the charge. Thus, although the heating arc is in direct contact with the body of molten slag, being struck from an electrode which terminates above the upper surface of the slag, and the heat so generated at the slag surface is transmitted to the dry charge thereabove, the charge itself is not heated by direct contact with the heating arc. Reduction of the readily-reducible metal oxides thus takes place in a smelting zone above the body of molten slag, the slag formed in the course of this reduction flowing downwardly to join the main body of slag. It will be observed that this smelting procedure assures substantially complete elimination of the reducible metal oxides from the charge by the time the charge is transformed into recoverable metal products and a molten slag. The slag which thus accumulates is substantially free of readily-reducible oxides (except for the aforementioned amount of iron oxide) before it comes into direct contact with the heating arc. This smelting procedure, we have discovered, is conducive to and is a prerequisite for the production of metallic zinc vapor-bearing smelting gases in an electric arc furnace capable of being condensed predominantly to massive zinc metal rather than to zinc dust.

In the course of the smelting operation most of the iron component of the ore is reduced to metallic iron which collects any copper and a substantial portion of any silver and gold present in the ore, and virtually all of the zinc component of the ore is removed as metallic zinc vapor which carries with it the lead and cadmium components of the ore as well as the remainder of any silver present in the ore. As a result, only gangue constituents remain as the slag, these gangue constituents being supplemented by the limited amount of iron oxide which is deliberately allowed to remain in the slag in accordance with our invention. The gangue constituents consist predominantly of lime and silica in the case of most zinciferous ores and are generally accompanied by relatively small amounts of magnesia and alumina, augmented by the presence of similar gangue-like constituents present in the coal ash. The relative proportions of these slag-forming constituents should be so controlled as to produce a slag having a sufficient fluidity to permit the ready settling therethrough of molten iron at a rate at least as high as that at which the iron is produced in the smelting zone within the normal operating temperature range of about 1100° to 1450° C. A slag fluidity of this order facilitates distribution therethrough of heat generated at the arc, and the resulting uniform slag temperature conditions contribute to an important extent to our ability to smelt zinciferous ores in an electric arc furnace with the production of metallic zinc vapor capable of being condensed predominantly to massive zinc metal.

Smelting of the dry charge in a zone above the body of molten slag and out of direct contact with the heating arc dictates charging of the furnace through inlets positioned above the slag layer and away from the electrodes. Charging through the furnace roof adjacent the furnace side walls satisfies these requirements provided the charge is introduced at such a rate, with respect to its angle of repose and the furnace geometry, as to form an inwardly and downwardly sloping bank of charge which terminates at the surface of the slag body out of direct contact with the arc formed between each electrode and the slag body. After the charge bank has developed, subsequent charges introduced through the furnace roof slide down the face of the bank and are delivered largely to the surface of the molten slag body. The charge on the face of the bank is heated to smelting temperature by radiation from the arc, and also by the heat transmitted thereto from the slag. General overheating of the slag by the arcs is prevented largely by the absorption of heat by the reducible material in the charge in contact with the slag. This absorption of heat tends to cool the surface of the slag and thereby provides a temperature-controlling buffer which prevents the development in the charge of a smelting temperature significantly in excess of about 1450° C. Accordingly, the manner in which the fresh charge is smelted and is in turn used as a temperature-controlling medium in accordance with our invention is particularly conducive to the liberation from the smelting zone of metallic zinc vapor capable of being condensed predominantly to massive zinc metal.

The only requirement for the physical form of charge used in practicing our invention is that it be loose and dry. By "loose" we mean that the charge should not be introduced in massive form, say, for example, as large sintered blocks or the like. The charge should be loose so that it will flow freely over the surface of the charge bank and down to the surface of the slag layer. By specifying that the charge should be "dry" we mean that it should not be added in the molten condition. It is a characteristic feature of the smelting method of our invention that the charge be smelted above the surface of the hot fluid furnace slag, and this condition can be met only when the charge is introduced into the furnace in the aforementioned loose dry form.

The degree of subdivision of the ore component of the charge is not critical. For example, we have charged directly to the electric furnace in accordance with our invention a flash roasted ore of which 6.6% was retained on 200 mesh (Tyler standard), 4.4% was retained on 325 mesh, and 89% was minus 325 mesh. We have also smelted sintered zinciferous ore the particles of which ran as large as ½ inch in diameter. Crude zinciferous ore has also been successfully smelted where the particles of ore ran about ¼ inch in diameter and finer. In general, we prefer to limit the maximum particle size of the ore in the charge to about ½ inch in diameter. Except for the problem of dusting there is no critical lower limit to the size of any of the charge particles.

We have found that condensing efficiency, expressed in terms of the amount of molten zinc metal obtained with respect to the amount of zinc charged to the furnace, can be materially improved by preheating the furnace charge. This preheating has no perceptible effect upon the smelting operation per se except for a reduction in the power required for smelting. The improvement in condensing efficiency by preheating the furnace charge appears to be attained as a result of control of the furnace gas temperature. When a cold charge is introduced into the furnace, the smelting gases rising adjacent the bank of charge are chilled by the relatively cool charge. Carbon monoxide, the predominating non-condensable component of the furnace atmosphere, is known to dissociate extensively into carbon dioxide and carbon at temperatures of the order of 900°–1000° C. Accordingly, it appears that the carbon monoxide-containing smelting gases rising in contact with a relatively cool furnace charge are chilled to that temperature range within which the carbon monoxide tends to dissociate. The resulting production of carbon dioxide causes immediate oxidation of zinc vapor which appears in the condenser as zinc dust. We have found, however, that preheating of the charge to a temperature of at least 500° C. at the time of its introduction into the furnace permits the charge to be heated in the presence of the rising smelting gases without chilling these gases to such an extent as to lower their temperature to the carbon monoxide-dissociating temperature range or to a temperature at which carbon dioxide already present in the furnace atmosphere will oxidize the zinc vapor.

More drastic preheating of the charge, i. e. to a temperature of at least 800° C., will still further lower the carbon dioxide content of the furnace gases in an additional manner. Copper oxide and ferric oxide in the furnace charge are reduced by contact with carbon monoxide in the furnace atmosphere, the carbon monoxide being transformed to carbon dioxide. But if the copper oxide and ferric oxide can be pre-reduced prior to introduction into the furnace, their reduction products (cuprous oxide or copper metal and ferrous oxide) do not produce objectionable amounts of carbon dioxide when exposed to carbon monoxide in the smelting operation. Thus, we have found that by preheating the ore-coal charge to a temperature of at least 800° C., the aforementioned pre-reduction is effected with attendant advantages in the condensation of the zinc vapor from the smelting gases. To obtain the full measure of this advantage, the preheated charge should be transferred to the smelting furnace with a minimum of cooling or other exposure to the ambient atmosphere which tends to reoxidize the copper and iron.

We have also found that if extraneous lime (CaO) be admixed with the charge components prior to preheating, the preheating operation, which effects combustion of some of the carbon in the charge, tends to form carbon dioxide which in turn carbonates the lime component of the ore. This carbonation of the lime introduces into the furnace a readily available supply of carbon dioxide which, as emphasized herein, is to be avoided wherever possible. Accordingly, we have found it advantageous not to add to the charge subjected to preheating any extraneous lime which may be added for fluxing purposes.

Condensation of the zinc vapor-bearing smelting gases produced in accordance with our invention can be readily accomplished with high efficiency. Although the zinc vapor may be effectively condensed in stationary baffle-type condensers such as that described in the United States patent to Bunce No. 1,873,861, condensation can be effected with particular advantage in a condenser of the type wherein the zinc vapor is brought into intimate contact with a relatively large freshly exposed surface of molten zinc. The latter type of condenser is represented by that wherein the zinc vapor-bearing gases are passed through a shower of molten zinc forcibly hurled through a confined condensing zone as described in United States Patents Nos. 2,457,544 through 2,457,551, 2,494,551 and 2,494,552. This latter type of zinc condenser is capable of removing and condensing to molten metal all of the zinc vapor contained in the smelting gases except for that amount of the vapor corresponding to the vapor pressure of molten zinc at the temperature of the exhaust condenser gases.

When smelting zinciferous ores in an electric furnace pursuant to our invention, the temperature of the carbon monoxide-containing furnace gases may pass through the range wherein the carbon monoxide tends to dissociate appreciably into carbon dioxide and carbon. The carbon dioxide, being a powerful oxidizing agent for zinc vapor, tends to produce rock oxide accretions and blue powder. If, however, an appreciable amount of nascent carbon is suspended in the furnace gases the presence of carbon dioxide therein can be substantially completely eliminated. Such a suspension of nascent carbon in the furnace atmosphere may be obtained by introducing into this atmosphere an amount of a crackable hydrocarbon such that when it is cracked in situ at the prevailing furnace atmosphere temperature it will yield a cloud of soot-like particles of nascent carbon. The carbon particles, being both nascent and incandescent as they float through the furnace gases, appear to be phenomenally effective in reducing the carbon dioxide content of these gases.

The crackable hydrocarbon must be introduced into the furnace atmosphere for cracking in situ therein and not into the smelting zone where it could be preferentially consumed in the smelting operation. For example, the crackable hydrocarbon may be introduced in the form of liquid fuel oil, kerosene, gas oil, or the like, by allowing it to drip into the furnace atmosphere. A permanent crackable gas, such as natural gas, acetylene, or the like, may also be introduced through a tube into the interior of the furnace atmosphere. Particularly effective results have been obtained by introducing the crackable hydrocarbon in an ostensibly solid form as the volatile component of bituminous coal. When some of the anthracite coal or coke used as the reducing material for the smelting operation is replaced by the equivalent amount of bituminous coal based on its solid carbon content, the volatile matter in this bituminous coal present in the charge floating on the molten slag layer is quickly liberated into the furnace atmosphere without being appreciably consumed by the smelting operation. The amount of crackable hydrocarbon used for this purpose is not critical, the carbon dioxide content of the furnace gases being progressively decreased by increasing amounts of crackable hydrocarbons introduced thereinto.

The smelting method of our invention is illustrated by the following specific example. Smelting was effected in a three-phase 1500 kilowatt furnace of conventional design provided with three 10-inch diameter graphite electrodes positioned in a straight line on centers spaced 2¾ feet apart. Two tap holes, one spaced 14 inches above the other, were provided for separately tapping a molten iron product and a molten slag. The furnace arch was provided with thirteen charging holes positioned near the side walls. The furnace arch was further provided with a smelting gas outlet which communicated, through a downcomer having a 15-inch by 18-inch cross-section, with a splash-type condenser constructed substantially according to our United States Patent No. 2,494,551. The proximity of the condenser to the furnace was such that under the furnace operating conditions recited hereinafter the furnace gases entered the condenser at a temperature of 1000°–1050° C.

The furnace charge, which was preheated to 800°–850° C. in an oil-fired kiln, was a mixed ore sinter analyzing as follows:

| | Per cent |
|---|---|
| Zn | 64.7 |
| Fe | 4.7 |
| Pb | 1.4 |
| Cd | 0.18 |
| Cu, Ag, Au | None |
| CaO | 2.5 |
| SiO$_2$ | 2.6 |

The furnace, already brought up to normal operating temperature, was operated for a period of four days under smelting conditions indicated by the following daily average operating figures:

| | |
|---|---|
| New ore charge, lbs | 18,768 |
| Recirculated blue powder, lbs | 2,311 |
| Anthracite, lbs | 3,245 |
| Bituminous coal, lbs | 425 |
| Lime, lbs | 451 |
| Charge weight, lbs | 25,200 |
| New ore charged; zinc, lead, and cadmium, lbs | 12,450 |
| Recirculated zinc in blue powder, lbs | 1,848 |
| Total zinc, lead, and cadmium in charge, lbs | 14,298 |
| Total iron in ore charge | 882 |
| Total zinc, lead, cadmium and iron in charge, lbs | 15,180 |
| Condensed metal cast, lbs | 11,400 |
| Zinc in blue powder produced, lbs | 2,311 |
| Condensed metal cast + zinc in blue powder, lbs | 13,711 |
| Recovery of zinc, lead, and cadmium in condenser products, percent | $\frac{13,711}{14,298} \times 100 = 95.9$ |
| Condenser efficiency, percent | $\frac{11,400}{13,711} \times 100 = 83.1$ |
| Condensed metal cast based on new zinc, lead, and cadmium in ore charged, percent | $\frac{11,400}{12,450} \times 100 = 91.5$ |
| Arch temperature, °C | 1250–1300 |
| Slag temperature, °C | 1350–1450 |
| Electrode voltage | 123 |
| Power input, kw.-hrs | 18,000 |
| Power input/lb. new ore, kw.-hrs | .96 |
| Power input/lb. Zn, Pb, Cd, and Fe in new ore, kw.-hrs | 1.35 |
| Power input/lb. condensed metal cast and Fe reduced, kw.-hrs | 1.47 |
| Power input/lb. condensed metal cast kw.-hrs | 1.58 |
| Slag analyses, percent: | |
| Zn | 0.4–0.8 |
| Fe | 1.1–2.5 |
| Pb | <0.03 |
| Cd | <0.01 |
| Cu | None in ore |
| Ag | None in ore |
| Au | None in ore |
| Estimated elimination based on slag analyses and estimated slag weights, percent: | |
| Zn | 99.9 |
| Fe | 92.5 |
| Pb | 99.6 |
| Cd | 99.0 |
| Cu | None in ore |
| Ag | None in ore |
| Au | None in ore |

Throughout the foregoing operation the charge was delivered to the furnace in such manner as to form a sloping charge bank within the furnace yet leaving an open slag bath approximately 4½ feet wide and 6 to 7 feet long disposed centrally in the vicinity of the electrodes. Some of the charge appeared to be smelted on the face of the charge bank by radiant heat from the arc formed between each electrode and the slag body, but the principal smelting zone appeared to be in the portion of the charge bank adjacent the open pool of molten slag. The slag itself was sufficiently fluid to permit ready settling of the molten metallic iron product formed in the smelting zone and was fluid when tapped at a temperature within the range of 1350°–1450° C. Virtually none of the charge was exposed to direct contact with the heating arcs. The zinc was recovered in molten massive condition along with most of the lead and cadmium originally present in the ore. The recovered zinc was sufficiently low in iron as to present no difficulty with dross accumulating in the condenser. The elimination of zinc, lead and cadmium was as high as could be desired, the iron elimination being somewhat lower but intentionally so. Copper, silver and gold eliminations have been found to be equally satisfactory in runs on other ores containing these constituents. For example, in a similar operation using a sintered ore analyzing 56.6% Zn, 16.0% Fe, 0.28% Pb, 0.15% Cd, 1.9% Cu, 2.6 oz. of silver and 0.01 oz. of gold per ton, the eliminations from the slag were: 99.7% of the zinc, 98.6% of the lead, 99.2% of the cadmium, 98.7% of the copper, 99.5% of the silver and all of the gold.

It will be seen, accordingly, that our invention offers a commercially attractive method of smelting zinciferous ores in an electric furnace. The method does not require anything other than coventional electric furnace equipment for the smelting operation and not only produces zinc metal but also a pig iron product both of which function as collectors for valuable metal by-products which can be readily recovered by conventional means. Under normal operating conditions in a commercial scale furnace there appears to be every reason to expect a recovery of 96–97% of the zinc component of the ore in the form of condensed molten zinc containing only those impurities which are now removed therefrom by conventional rectification. Substantially complete recovery of the lead, cadmium, copper, silver and gold contents of the zinciferous ore can be realized in accordance with our invention, the lead, cadmium and some of the silver being recovered from the condensed metallic zinc and the copper and the balance of the silver and gold being recoverable from the iron product in a copper converter or the like.

We claim:

1. The method of smelting an oxidic zinciferous ore with solid carbonaceous reducing material in an electric arc furnace with the resulting production of a substantially zinc-free molten slag and metallic zinc vapor capable of being condensed predominantly to massive zinc metal which comprises heating the body of said slag by an electric arc in direct contact with the slag and struck from an electrode terminating above the upper surface of the slag to a temperature not in excess of 1450° C., introducing into the furnace a charge comprising the zinciferous ore, iron oxide and an amount of said reducing material sufficient to effect reduction of all of the zinc oxide component of the ore to metallic zinc and to effect reduction of such an amount of the iron oxide as to form a body of molten iron product underlying said slag but to leave in the slag at least 1½% but not more than about 6% by weight of iron oxide (calculated as Fe), delivering said charge adjacent the furnace side walls in the form of a loose mass of discrete particles and at such a rate with respect to its angle of repose and the furnace geometry as to form an inwardly and downwardly sloping bank of the charge which terminates at the surface of the slag body out of direct contact with the electrode and the heating arc, and smelting the charge above the body of molten slag by imparting smelting heat to said charge through its contact with the molten slag body and through radiation from the heating arc, whereby the slag resulting from said smelting is substantially free of readily-reducible oxides except for the aforementioned amount of iron oxide before it comes into direct contact with the heating arc and the metallic zinc vapor-bearing smelting gases are thus capable of being condensed to massive molten metal.

2. The method of producing molten zinc metal directly from an oxidic zinciferous ore by smelting the ore with solid carbonaceous reducing material in an electric arc furnace with the resulting production of a substantially zinc-free molten slag and metallic zinc vapor capable of being condensed predominantly to massive zinc metal which comprises heating the body of said slag by an electric arc in direct contact with the slag and struck from an electrode terminating above the upper surface of the slag to a temperature not in excess of 1450° C., introducing into the furnace a charge comprising the zinciferous ore, iron oxide and an amount of said reducing material sufficient to effect reduction of all of the zinc oxide component of the ore to metallic zinc and to effect reduction of such an amount of the iron oxide as to form a body of molten iron product underlying said slag but to leave in the slag at least 1½% but not more than about 6% by weight of iron oxide (calculated as Fe), delivering said charge adjacent the furnace side walls in the form of a loose mass of discrete particles and at such a rate with respect to its angle of repose and the furnace geometry as to form an inwardly and downwardly sloping bank of the charge which terminates at the surface of the slag body out of direct contact with the electrode and the heating arc, smelting the charge above the body of molten slag by imparting smelting heat to said charge through its contact with the molten slag body and through radiation from the heating arc, whereby the slag resulting from said smelting is substantially free of readily-reducible oxides except for the aforementioned amount of iron oxide before it comes into direct contact with the heating arc, and condensing the evolved zinc vapor to massive molten metal.

3. The method of producing molten zinc metal directly from an oxidic zinciferous ore by smelting the ore with solid carbonaceous reducing material in an electric arc furnace with the resulting production of a substantially zinc-free molten slag and metallic zinc vapor capable of being condensed predominantly to massive zinc metal which comprises heating the body of said slag by an electric arc in direct contact with the slag and struck from an electrode terminating above the upper surface of the slag to a temperature not in excess of 1450° C., preheating to at least 500° C. a furnace charge comprising the zinciferous ore, iron oxide and an amount of said reducing material sufficient to effect reduction of all of the zinc oxide component of the ore to metallic zinc and to effect reduction of such an amount of the iron oxide as to form a body of molten iron product underlying said slag but to leave in the slag at least 1½% but not more than about 6% by weight of iron oxide (calculated as Fe), delivering said preheated charge into the furnace adjacent the furnace side walls in the form of a loose mass of discrete particles and at such a rate with respect to its angle of repose and the furnace geometry as to form an inwardly and downwardly sloping bank of the charge which terminates at the surface of the slag body out of direct contact with the electrode and the heating arc, smelting the charge above the body of molten slag by imparting smelting heat to said charge through its contact with the molten slag body and through radiation from the heating arc, whereby the slag resulting from said smelting is substantially free of readily-reducible oxides except for the aforementioned amount of iron oxide before it comes into direct contact with the heating arc and the metallic zinc vapor-bearing smelting gases are thus capable of being condensed predominantly to massive molten zinc metal, and condensing the evolved zinc vapor to massive molten metal.

4. The method of producing molten zinc metal directly from an oxidic zinciferous ore by smelting the ore with solid carbonaceous reducing material in an electric arc furnace with the resulting production of a substantially zinc-free molten slag and metallic zinc vapor capable of being condensed predominantly to massive zinc metal which comprises heating the body of said slag by an electric arc in direct contact with the slag and struck from an electrode terminating above the upper surface of the slag to a temperature not in excess of 1450° C., preheating to a temperature of at least 800° C. a furnace charge comprising the zinciferous ore, iron oxide and an amount of said reducing material sufficient to effect reduction of all of the zinc oxide component of the ore to metallic zinc and to effect reduction of such an amount of the iron oxide as to form a body of molten iron product underlying said slag but to leave in the slag at least 1½% but not more than about 6% by weight of iron oxide (calculated as Fe), delivering said preheated charge into the furnace adjacent the furnace side walls in the form of a loose mass of discrete particles and at such a rate with respect to its angle of repose and the furnace geometry as to form an inwardly and downwardly sloping bank of the charge which terminates at the surface of the slag body out of direct contact with the electrode and the heating arc, smelting the charge above the body of molten slag by imparting smelting heat to said charge through its contact with the molten slag body and through radiation from the heating arc, whereby the slag resulting from said smelting is substantially free of readily-reducible oxides except for the aforementioned amount of iron oxide before it comes into direct contact with the heating arc, and condensing the evolved zinc vapor to massive molten metal.

ERWIN C. HANDWERK.
GEORGE T. MAHLER.

REFERENCES CITED

The following references are of record in the file of this patent:

UNITED STATES PATENTS

| Number | Name | Date |
|---|---|---|
| 766,279 | Nagel | Aug. 2, 1904 |
| 1,150,271 | Johnson | Aug. 17, 1915 |
| 1,738,910 | Lepsoe | Dec. 10, 1929 |
| 2,457,544 | Handwerk et al. | Dec. 28, 1948 |
| 2,509,326 | Weaton et al. | May 30, 1950 |